United States Patent
Chien et al.

(10) Patent No.: US 6,499,222 B1
(45) Date of Patent: Dec. 31, 2002

(54) TEMPLATE FOR MEASURING EDGE WIDTH AND METHOD OF USING

(75) Inventors: Hung-Ju Chien, Hsinchu (TW); Ying-Hsiang Chen, Hsin-Chu (TW); Wen-Kung Cheng, Mai-Li (TW); Yin-Lang Wang, Taichung (TW)

(73) Assignee: Taiwan Semiconductor Manufacturing Company, Ltd, Hsin Chu (TW)

( * ) Notice: Subject to any disclaimer, the term of this patent is extended or adjusted under 35 U.S.C. 154(b) by 0 days.

(21) Appl. No.: 09/240,414

(22) Filed: Jan. 29, 1999

(51) Int. Cl.7 .................................................. G01B 3/14
(52) U.S. Cl. ........................ 33/562; 33/555.1; 33/1 BB
(58) Field of Search .......................... 33/494, 832, 833, 33/834, 836, 501.45, 562, 563, 15 B, 679.1, 555.1, 565, 1 B, 1 C, 1 BB

(56) References Cited

U.S. PATENT DOCUMENTS

| | | | | |
|---|---|---|---|---|
| 2,014,190 A | * | 9/1935 | Simon | 33/565 |
| 2,478,071 A | * | 8/1949 | Agrillo | 33/565 |
| 4,129,948 A | * | 12/1978 | Hatter et al. | 33/1 B |
| 4,131,998 A | * | 1/1979 | Spears | 33/1 BB |
| 4,169,319 A | * | 10/1979 | Gardner | 33/834 |
| 4,353,988 A | * | 10/1982 | Couse et al. | 33/1 BB |
| 4,389,782 A | * | 6/1983 | Webster | 33/1 BB |
| 4,676,005 A | * | 6/1987 | Seligman | 33/525 |
| 5,065,518 A | * | 11/1991 | Herrera | 33/1 BB |
| 5,347,721 A | * | 9/1994 | Asterino, Jr. | 33/565 |
| 5,884,408 A | * | 3/1999 | Simmons | 33/494 |
| 5,913,979 A | * | 6/1999 | Shen et al. | 134/2 |
| 6,332,275 B1 | * | 12/2001 | Tsai et al. | 33/1 BB |

FOREIGN PATENT DOCUMENTS

| | | | | |
|---|---|---|---|---|
| SU | | 1086142 | * 4/1984 | 33/562 |

* cited by examiner

*Primary Examiner*—Diego Gutierrez
*Assistant Examiner*—Madeline Gonzalez
(74) *Attorney, Agent, or Firm*—Tung & Associates

(57) ABSTRACT

A template for measuring the edge width on a disk that is not covered by a coating layer on a top surface of the disk and a method for using such template are disclosed. The template is made of a substantially transparent sheet that has a contour substantially the same as the contour of the disk to be measured. A series of marks are provided on a top surface of the sheet along a peripheral edge of the sheet at numerous predetermined distances from the peripheral edge. The marks may be provided in scribed thin lines, or the marks may be provided in scribed thin lines that are color coded for easier identification purpose. The present invention novel template can be most suitably used on a silicon wafer of any size. However, it can also be used on a disk of any shape or contour to produce the same desirable result.

16 Claims, 2 Drawing Sheets

TEMPLATE FOR MEASURING EDGE WIDTH AND METHOD OF USING

FIELD OF THE INVENTION

The present invention generally relates to a template for measuring a distance from an edge of a disk and a method of using the template and more particularly, relates to a template for measuring a distance from a wafer edge after an edge bead rinse process to determine how well the process is centered with the wafer and a method of using the template.

BACKGROUND OF THE INVENTION

Spin-on-glass (SOG) is frequently used for gap fill and planarization of inter-level dielectrics (ILD) in multi-level metalization structures. It is a suitable material for use in low-cost fabrication of IC circuits. Most commonly used SOG materials are of two basic types; an inorganic type of silicate based SOG and an organic type of siloxane based SOG. One of the commonly used organic type SOG materials is a silicon oxide based polysiloxane which is featured with radical groups replacing or attaching to oxygen atoms. Based on these two basic structures, the molecular weight, the viscosity and the desirable film properties of SOG can be modified and adjusted to suit the requirement of specific IC fabrication process.

SOG film is typically applied to a pre-deposited oxide surface as a liquid to fill gaps and steps on the substrate. Similar to the application method for photoresist films, a SOG material can be dispensed onto a wafer and spun at a rotational speed which determines the thickness of the SOG layer desired. After the film is evenly applied to the surface of the substrate, it is cured at a temperature of approximately 400° C. and then etched back to obtain a smooth surface in preparation for a capping oxide layer on which a second interlevel metal may be patterned. The purpose of the etch-back step is to leave SOG between metal lines but not on top of the metal, while the capping oxide layer is used to seal and protect SOG during further fabrication processes. The siloxane based SOG material is capable of filling 0.15 micron gaps and therefore it can be used advantageously in 0.25 micron technology, When fully cured, silicate SOG has similar properties like those of silicon dioxide. Silicate SOG does not absorb water in significant quantity and is thermally stable. However, one disadvantage of silicate SOG is the large volume shrinkage during curing. As a result, the silicate SOG retains high stress and cracks easily during curing and further handling. The cracking of the SOG layer can cause a serious contamination problem for the fabrication process. The problem can sometimes be avoided by the application of only a thin layer, i.e., 1000~2000 Å of the silicate SOG material.

In the current SOG coating process, a solvent edge rinse and a solvent backside rinse process are utilized to remove unwanted SOG deposited on the wafer edge and on the backside of the wafer. This is shown in FIGS. 1~3. A semiconductor wafer 10 which has a flat side 12 is shown in FIG. 1. After a SOG coating process, a SOG layer 14 is blanket deposited on the top surface 16 of the wafer. The layer is deposited as a dielectric layer for insulating between metal lines. In order to process the wafer in subsequent fabrication steps, the wafer must be positioned in reaction chambers for various processes such as etching or deposition. In most of the process chambers, the wafer is positioned on a platform and held down on the edge by a wafer clamp. The function of the wafer clamp is to prevent the wafer from moving during the process when reactant gases or etching gases may be flowing into the reaction chamber. To enable the wafer clamp to function properly, the edge portion of the wafer of approximately 2~4 mm wide must be cleaned without any coated material. The edge area 22 on wafer 10 is shown in FIG. 1.

In present wafer fabrication technology, the SOG layer deposited at unintended areas of the wafer can be removed in two different processes. The first process is a solvent edge rinse which is shown in FIG. 2. In this process, wafer 10 is placed on a platform (not shown) and spun at a predetermined rotational speed along a spin axis 26. The rotational speed of the wafer can be suitably adjusted for each specific application depending on the thickness of the layer to be removed and the type of chemical solution used. As shown in FIG. 2, a chemical solution injector 28 is used to inject chemical solution 32 onto the top edge 34 of the wafer. The chemical solution 38 deflected from the edge 34 of the wafer hits the chamber wall 42 and drains to the bottom of the process chamber. The solvent edge rinse process is effective in removing a limited area, i.e., a width of 2~4 mm, on the top edge of the wafer of an unwanted coating material such as SOG or photoresist.

The second cleaning process is a solvent backside rinse such as that shown in FIG. 3. The backside 48 of wafer 10 can be cleaned by this process. A cleaning solution 52 is injected from a spray nozzle 54 onto the backside 48 of the wafer. The process is also known as a centrifugal spray cleaning process wherein a chemical solution, i.e., normally a good solvent for the coating layer is pressure-fed and injected directly onto the backside of a spinning wafer. The process can be effectively used to reduce the volume of fresh chemical consumed and is normally faster than an immersion process. After the injected chemical solution 52 hits the bottom surface 48 of the wafer, the chemical solution 56 reflects from the backside 48 of the wafer and drains into the bottom of the process tank (not shown). During a normal backside rinse process, the sprayed chemical solution 52 is only capable of rinsing the backside 48 of the wafer and, none of the chemical solution 52 can reach the top surface 16.

After an edge bead rinse process is conducted on a processed silicon wafer 10, the concentricity of the rinse process must be determined in order to assure the quality of the IC dies (not shown) on the wafer 10. Traditionally, this is carried out by using a straight ruler 20 as shown in FIG. 4. The scales 24 on the straight ruler 20 is used to measure the edge rinse width 30. The measurement of the edge rinse width 30 may also be performed by using a caliper (not shown).

The measurement process for the edge rinse width 30 is an important step in the quality control of the edge bead rinse process. For instance, as shown in FIG. 5, when the concentricity of the SOG coating layer 14 is off in relationship to the wafer 10, serious quality problems occur in the numerous IC dies that are located on the edge of the wafer 10. Quality problems arising out of particle contamination may also result due to cracked SOG material. For instance, as shown in FIG. 5, portion 36 of the SOG coating layer resulting from a narrow edge rinse width 40 may cause SOG layer cracking issue in a subsequent process where wafer 10 is held down by a clamp ring (not shown). The excess SOG coating layer 36 when clamped under a ring crack and may cause serious particle contamination problem in a process chamber. On the other hand, at the opposite edge of the wafer 10, an excessively wide area 44 of the edge rinse width occurs in portion 46 of the SOG coating layer. The excessive removal of the SOG coating layer 14 results in some of the IC dies located in the area being damaged by a water jet that was used in the edge bead rinse process. The IC dies are damaged even when a small corner of the die is hit by the high velocity water jet.

A reliable measurement tool and a method for using such tool are therefore important issues in ascertaining the reliability of an edge bead rinse process. The concentricity of the edge bead rinse process in relationship to the wafer must be determined with high accuracy in order to calibrate the edge bead rinse apparatus, i.e., the position of the rinse nozzle. The calibration may be performed both at the beginning of an edge bead rinse process as a step in the set-up procedure, and during subsequent processes for checking reliability, i.e., the concentricity of the rinse pattern must be checked frequently to insure the reliability of the process. The conventional measurement technique of using a ruler or a caliper is inadequate in that it is not only time consuming and operator dependent but also inaccurate and requires many reading points along the circumferential edge of a wafer.

It is therefore an object of the present invention to provide a measurement tool for measuring the edge rinse width on a wafer without the shortcomings or drawbacks of the conventional measurement tools.

It is another object of the present invention to provide a measurement tool for edge rinse width on a wafer after an edge bead rinse process is conducted which can be readily used and is not operator dependent.

It is a further object of the present invention to provide a measurement tool for determining edge rinse width on a wafer after an edge bead rinse process is conducted which can be used in a single measurement step.

It is another further object of the present invention to provide a measurement tool for determining edge rinse width on a wafer after an edge bead rinse process is conducted which can be readily used to produce accurate readings.

It is still another object of the present invention to provide a measurement tool for determining edge rinse width on a wafer after an edge bead rinse process is conducted which can be fabricated of a substantially transparent sheeting material.

It is yet another object of the present invention to provide a measurement tool for determining edge rinse width on a wafer after an edge bead rinse process which incorporates multiple concentric marks placed juxtaposed to a circumferential edge of the wafer.

It is still another further object of the present invention to provide a method for measuring the width of a peripheral region on a disk which has a different optical appearance than the remaining areas on the disk by superimposing a substantially clear template having concentric circles marked on the template in different colors.

It is yet another further object of the present invention to provide a method for measuring the width of a peripheral region on a processed silicon wafer after an edge bead rinse process for determining the concentricity of the process in relationship to the wafer.

SUMMARY OF THE INVENTION

In accordance with the present invention, a template for measuring the edge width of a disk and a method for using such template are disclosed.

In a preferred embodiment, a template for measuring the edge width of a disk which is not covered by a coating layer on a top surface of the disk is provided which includes a substantially transparent sheet that has a contour substantially the same as the contour of the disk, a first mark made along a peripheral edge of the sheet at a first distance from the peripheral edge, and a second mark made along a peripheral edge of the sheet at a second distance from the peripheral edge, the second distance is larger than the first distance.

The template for measuring the edge width of a disk may further include a third mark made along a peripheral edge of the sheet at a third distance from the edge, the third distance is greater than the second distance. The disk may be a semiconductor wafer. The first mark and the second mark may be a continuous line having a line width smaller than 0.5 mm. The first mark and the second mark may further be color coded for ease of identification.

In the template for measuring the edge width of a disk, the first distance of the first mark may be less than 5 mm, while the second distance for the second mark may be less than 10 mm. The contour for the substantially transparent sheet may be circular. The coating layer on the top surface of the disk may be a photoresist layer or a spin-on-glass coating layer. The first mark may be a red line formed 2 mm from the peripheral edge, the second mark may be a green line formed 3 mm from the peripheral edge and the third mark may be a yellow line formed 4 mm from the peripheral edge. The edge width measured is an edge rinse width on a silicon wafer. The substantially transparent sheet may be formed of a clear plastic material.

The present invention is further directed to a method for measuring the width of a peripheral region on a disk that has a different optical appearance than the remaining areas on the disk which can be carried out by the operating steps of first providing a substantially transparent sheet which has a contour substantially the same as the contour of the disk, a first mark made along a peripheral edge of the sheet at a first distance from the peripheral edge, and a second mark made along a peripheral edge of the sheet at a second distance from the peripheral edge wherein the second distance is greater than the first distance, then positioning the substantially transparent sheet on top and substantially overlaps the disk, and comparing the positions of the first mark and the second mark with the width of the peripheral region on the disk which has the different optical appearance than the remaining areas on the disk such that a dimension of the peripheral region can be readily determined.

In the method for measuring the width of a peripheral region on a disk, the substantially transparent sheet may further include a third mark made along a peripheral edge of the sheet at a third distance larger than the second distance from the edge. The disk may be a silicon wafer coated with a photoresist layer that has the peripheral edge portion of the layer removed by an edge bead rinse process. The disk may further be a silicon wafer coated with a spin-on-glass coating layer which has the peripheral edge portion of the layer removed in an edge bead rinse process.

The method may further include the step of forming the first and the second mark in a continuous line which has a width smaller than 0.5 mm. The method may further include the step of forming the first and second mark in different colors for ease of identification. The method may further include the step of forming the first mark on the sheet at a first distance of less than 5 mm from the edge of the sheet. The method may further include the step of forming the second mark on the sheet at a distance of less than 10 mm from the edge of the sheet.

In the method, the contour of the substantially transparent sheet may be circular. The method may be used to measure an edge bead rinse width on a silicon wafer after a photoresist or SOG coating process. The method may further include the step of forming the first mark in a red line 2 mm from the circumferential edge, the second mark in a green line 3 mm from the circumferential edge and the third mark in a yellow line 4 mm from the circumferential edge of a silicon wafer. The method may further include the step of forming the substantially transparent sheet in a clear plastic material.

BRIEF DESCRIPTION OF THE DRAWING

These and other objects, features and advantages of the present invention will become apparent from the following detailed description and the appended drawings in which.

DETAILED DESCRIPTION OF THE PREFERRED EMBODIMENT

The present invention discloses a template for measuring the edge width of a disk that is not covered by a coating layer on a top surface of the disk and a method for using the template. The template may be formed of a substantially transparent sheet such as a clear plexiglass sheet in a contour that is substantially the same as the contour of a disk to be measured. Most likely, the contour of the disk is a circular shape such as that of a silicon wafer. A first mark is made along a peripheral edge, or a circumferential edge in the case of a wafer, of the sheet at a first distance from the peripheral edge. A second mark is then made along a peripheral edge of the sheet at a second distance from the peripheral edge wherein the second distance is greater than the first distance. The first and the second mark may be formed in a continuous thin line which has a line width of smaller than 0.5 mm, and preferably smaller than 0.2 mm. The marks may further be colored coded for easier identification of the peripheral edge of a coating layer on the disk. A first distance for the first mark from the peripheral edge may be smaller than 5 mm, while a second distance for the second mark may be less than 10 mm. The sheet may be formed of a substantially transparent, or semi-transparent plastic material. A suitable plastic material for such use is plexiglass. The substantially transparent sheet may further be provided with a handle on a top surface mounted by adhesive means for ease of handling.

The present invention further discloses a method which can be used for measuring the width of a peripheral region on a disk that has a different optical appearance than the remaining areas on the disk. The method can be carried out by first providing a substantially transparent sheet that has a contour similar to a contour of the disk, a first mark made along a peripheral edge of the sheet at a first distance from the edge, and a second mark made along a peripheral edge of the sheet at a second distance from the peripheral edge wherein the second distance is greater than the first distance. The substantially transparent sheet can then be positioned on top and overlaps the disk for comparing the positions of the first mark, the second mark with the width of the peripheral region on the disk that has the different optical appearance than the remaining areas on the disk so that a dimension of the peripheral region may be determined. The method may suitably be used for measuring an edge rinse width on a silicon wafer after a photoresist or SOG coating process.

Figure 1:
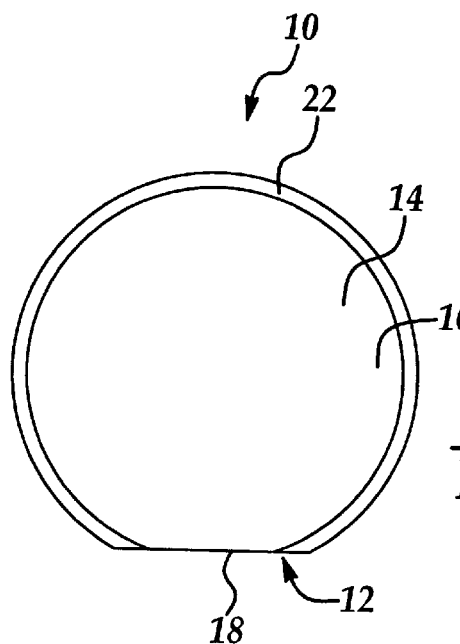
FIG. 1 is a top view of a conventional wafer which has a SOG bead built up at the flat edge of the wafer.
Figure 2:
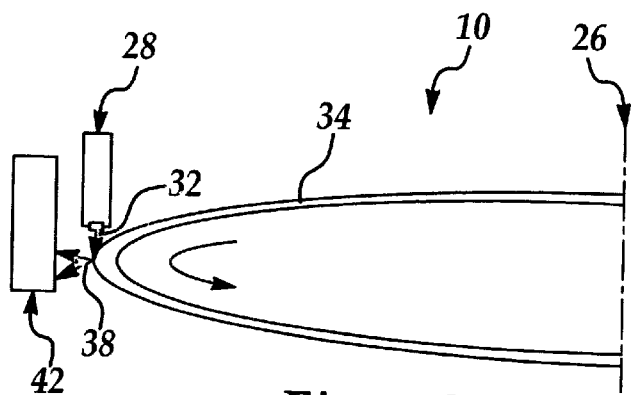
FIG. 2 is a perspective view illustrating a conventional method of solvent edge rinse on a wafer.
Figure 3:
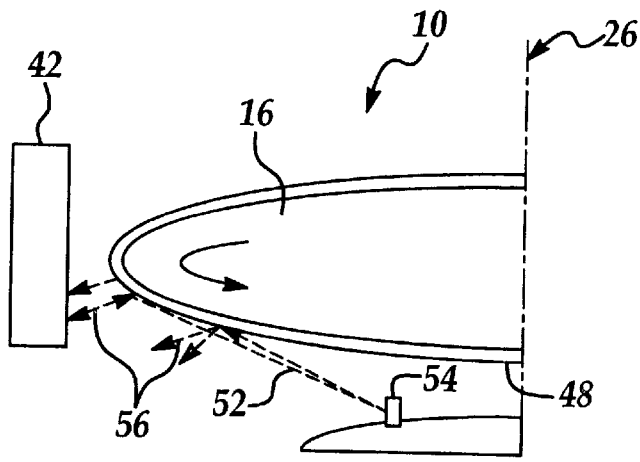
FIG. 3 is a perspective view illustrating a conventional method of solvent backside rinse on a wafer.
Figure 4:
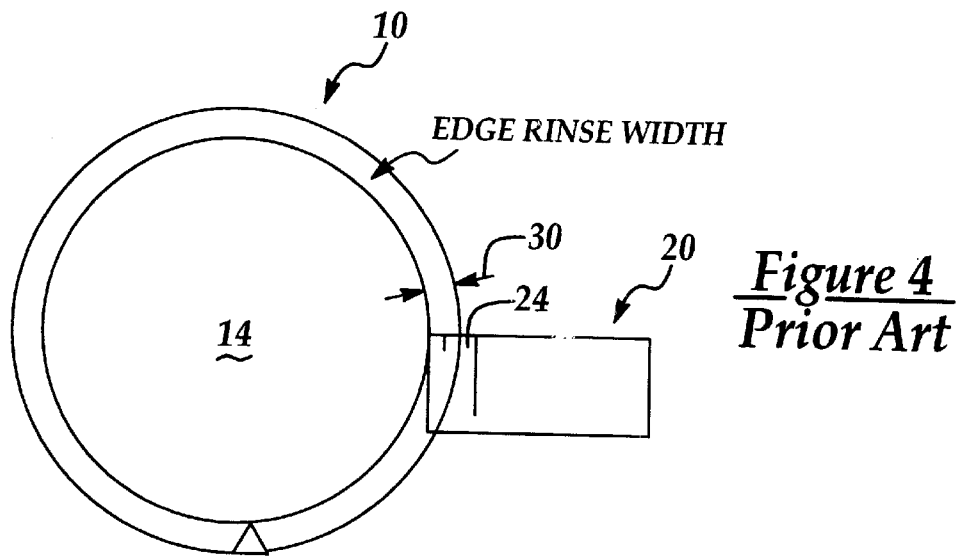
FIG. 4 is a plane view of a notched wafer having an edge rinse width measured by a straight ruler.
Figure 5:
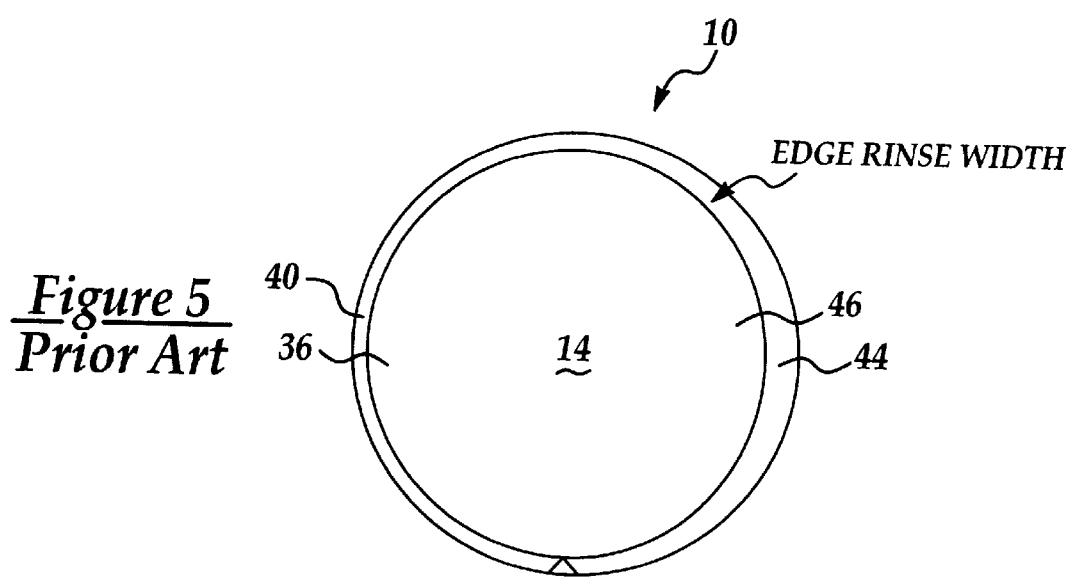
FIG. 5 is a plane view of a wafer that has an off-centered coating layer deposited on top.
Figure 6:
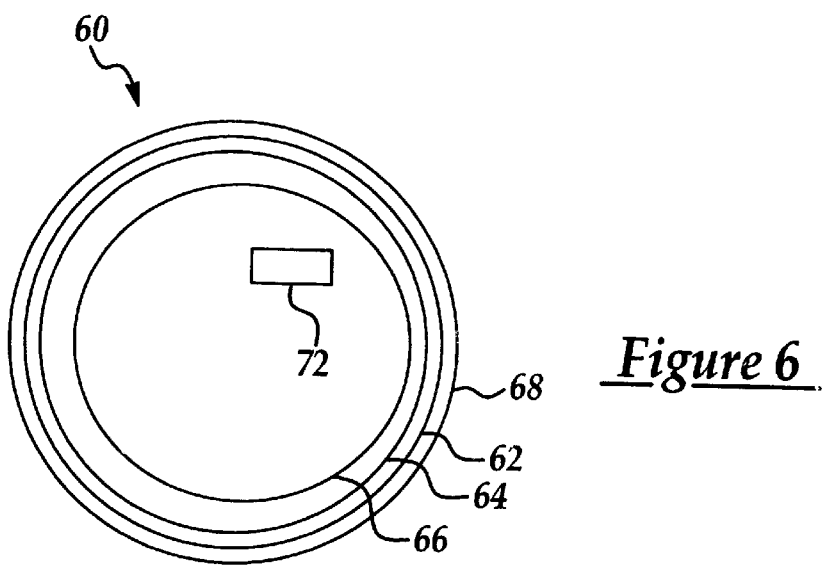
FIG. 6 is a plane view of the present invention novel apparatus for measuring the concentricity of a coating layer on a preprocessed silicon wafer after an edge bead rinse process.

Referring now to FIG. 6 wherein a present invention apparatus of a substantially transparent sheet 60 is shown. The sheet 60 is formed in a circular contour to match that of a silicon wafer. For instance, the sheet 60 may be provided in an 8 inch diameter circular shape for use on an 8 inch silicon wafer. Similarly, a 6-inch or a 12-inch sheet may also be provided for use on a 6-inch or a 12-inch wafer.

The substantially transparent sheet may be 100% transparent such as a clear plastic sheet or semi-transparent such as a translucent plastic sheet. The substantially clear sheet 60, shown in FIG. 6, is further provided with a handle 62 for ease of operation of the sheet (the template) 60. In the specific embodiment of the present invention apparatus shown in FIG. 6, three marks in the form of continuous thin lines are provided, i.e., 62, 64 and 66 spaced apart from the circumferential edge 68 of the sheet. The first mark 62 is spaced apart from the circumferential edge 68 by a distance of approximately 2 mm. The second mark 64 may be spaced apart from the circumferential edge 68 by approximately 3 mm, while the third mark 66 may be suitably positioned spaced apart from the circumferential edge 68 at 4 mm. It should be noted that these marks are not shown in scale in FIG. 6.

For easier identification, it is preferred that the marks 62, 64 and 66 be provided in a thin width, such as a width smaller than 0.5 mm or preferably, smaller than 0.2 mm. The marks 62, 64 and 66 may further be provided in different colors such that the edge of a coating layer on a wafer may be readily identified and compared to the marks. It has been found that for an 8-inch wafer that was edge rinsed after a SOG or photoresist coating process, a total of 3 marks (as shown in FIG. 6) marking a total distance of 4 mm from the circumferential edge of the wafer is adequate. In one example, the first mark 62 is formed in red, the second mark 64 is formed in green and the third mark 66 is formed in yellow. The substantially transparent sheet (or the template) can be easily fabricated from a clear plexiglass material. The marks are then scribed on the top surface of the sheet spaced apart from a circumferential edge of the sheet. The scribed lines are then colored with a color ink to any suitably selected color. The handle 72 is used for easier handling or positioning of the sheet 60 on top of a wafer. The position of the handle is deliberately placed off-center so that it does not block the view of the center of the wafer.

It should be noted that while the present invention novel apparatus and method has been demonstrated in a circular sheet, or in a circular template, the applications of the present invention novel apparatus is in no way limited to a circular object or disk. Any other shapes, regardless of a square, a rectangle or an irregular shape may also utilize the present invention novel template as long as the template is shaped exactly to the contour of the object to be measured. The marks on the top surface of the template may be scribed at a predetermined distance from the peripheral edge of the template. This can be accomplished by using a simple tool such as a compass.

The present invention novel apparatus of a transparent template can be readily used for easy identification of an edge rinse width on a disk of any shape or contour. The method for using the present invention novel apparatus is not operator dependent and can be carried out in a short period of time. Furthermore, the present invention novel apparatus can be used to produce great accuracy in the measurement of edge rinse width on a disk, or a circular shaped wafer.

The present invention novel method and apparatus for using a template to measure edge rinse width on a disk have therefore been amply demonstrated in the above descriptions and in the appended drawing of FIG. 6.

While the present invention has been described in an illustrative manner, it should be understood that the terminology used is intended to be in a nature of words of description rather than of limitation.

Furthermore, while the present invention has been described in terms of a preferred embodiment, it is to be appreciated that those skilled in the art will readily apply these teachings to other possible variations of the inventions.

The embodiment of the invention in which an exclusive property or privilege is claimed are defined as follows:

What is claimed is:

1. A template for measuring the width of an edge portion of a disk having a different appearance than a center portion of the disk comprising:
   a substantially transparent sheet having a contour substantially the same as the contour of a disk to be measured,
   a first mark made along a peripheral edge of said sheet at a first distance from said peripheral edge, and
   a second mark made along a peripheral edge of said sheet at a second distance from said peripheral edge, said second distance being greater than said first distance, said first mark and said second mark being formed in different colors within 10 mm from said peripheral edge of said sheet.

2. A template for measuring the width of an edge portion of a disk having a different appearance than a center portion of the disk according to claim 1 further comprising a third mark made along a peripheral edge of said sheet at a third distance from said edge, said third distance being greater than said second distance.

3. A template for measuring the width of an edge portion of a disk having a different appearance than a center portion of the disk according to claim 2, wherein said first mark is formed in red 2 mm from the peripheral edge, said second mark is formed in green 3 mm from the peripheral edge.

4. A template for measuring the width of an edge portion of a disk having a different appearance than a center portion of the disk according to claim 1, wherein said template having a contour similar to that of a semiconductor wafer.

5. A template for measuring the width of an edge portion of a disk having a different appearance than a center portion of the disk according to claim 1, wherein said first mark and said second mark are a continuous line having a line width smaller than 0.5 mm.

6. A template for measuring the width of an edge portion of a disk having a different appearance than a center portion of the disk according to claim 1, wherein said first distance for said first mark is less than 5 mm.

7. A template for measuring the width of an edge portion of a disk having a different appearance than a center portion of the disk according to claim 1, wherein said second distance for said second mark is less than 10 mm.

8. A template for measuring the width of an edge portion of a disk having a different appearance than a center portion of the disk according to claim 1, wherein said contour for said substantially transparent sheet being circular.

9. A template for measuring the edge width of a disk not covered by a coating layer on a top surface of the disk according to claim 1, wherein said substantially transparent sheet is made of a clear plastic material.

10. A template for measuring the width of an edge portion of a disk comprising:
    a substantially transparent sheet having a contour substantially the same as the contour of said disk,
    a first mark in red made along a peripheral edge of said sheet at a first distance from said peripheral edge,
    a second mark in green made along a peripheral edge of said sheet at a second distance from said peripheral edge, said second distance being greater than said first distance; and
    a third mark in yellow made along a peripheral edge of said sheet at a third distance from said edge, said third distance being greater than said second distance wherein said second distance for said second mark is less than 10 mm.

11. A template for measuring the width of an edge portion of a disk not covered by a coating layer according to claim 10, wherein said template having a contour similar to that of a semiconductor wafer.

12. A template for measuring the width of an edge portion of a disk not covered by a coating layer according to claim 10, wherein said first mark and said second mark are a continuous line having a line width smaller than 0.5 mm.

13. A template for measuring the width of an edge portion of a disk not covered by a coating layer according to claim 10, wherein said first distance for said first mark is less than 5 mm.

14. A template for measuring the width of an edge portion of a disk not covered by a coating layer according to claim 10, wherein said contour for said substantially transparent sheet is circular.

15. A template for measuring the width of an edge portion of a disk not covered by a coating layer according to claim 10, wherein said first mark is formed 2 mm from the peripheral edge, said second mark is formed 3 mm from the peripheral edge and said third mark is formed 4 mm from the peripheral edge.

16. A template for measuring the width of an edge portion of a disk not covered by a coating layer according to claim 10, wherein said substantially transparent sheet is made of a clear plastic material.

* * * * *